United States Patent
Zhang

(10) Patent No.: US 12,061,505 B2
(45) Date of Patent: Aug. 13, 2024

(54) ELECTRONIC APPARATUS AND POWER SUPPLY METHOD

(71) Applicant: Lenovo (Beijing) Limited, Beijing (CN)

(72) Inventor: Ye Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 227 days.

(21) Appl. No.: 17/689,956

(22) Filed: Mar. 8, 2022

(65) Prior Publication Data

US 2023/0101495 A1  Mar. 30, 2023

(30) Foreign Application Priority Data

Sep. 30, 2021 (CN) .......................... 202111163389.8

(51) Int. Cl.
*G06F 1/26* (2006.01)
(52) U.S. Cl.
CPC .............. *G06F 1/263* (2013.01); *G06F 1/266* (2013.01)
(58) Field of Classification Search
CPC ........ G06F 1/263; G06F 1/266; G06F 1/1632; Y02B 70/30; Y04S 20/20; H02J 9/061
See application file for complete search history.

(56) References Cited

U.S. PATENT DOCUMENTS

| | | | |
|---|---|---|---|
| 2010/0146307 A1* | 6/2010 | Griffin, Jr. | G06F 1/263 713/300 |
| 2016/0216750 A1* | 7/2016 | Hundal | G06F 13/4068 |
| 2022/0166241 A1* | 5/2022 | Sung | H01R 13/6666 |
| 2022/0382350 A1* | 12/2022 | Menon | G06F 13/4004 |

\* cited by examiner

*Primary Examiner* — Jaweed A Abbaszadeh
*Assistant Examiner* — Brian J Corcoran
(74) *Attorney, Agent, or Firm* — ANOVA LAW GROUP, PLLC

(57) ABSTRACT

An electronic apparatus includes a first component and a second component. The first component is configured to connect to a processing device containing a power storage module, and the second component is configured to connect to an extension device. In a first state, the electronic apparatus connects to the processing device and the expansion device. An external power supply provides power to the processing device through the first component, and provides power to the expansion device. In a second state, the electronic apparatus connects to the processing device and the expansion device. In response to the external power supply being cut off, power is supplied to the expansion device through the second component. The processing device is powered by its power storage module. After the electronic apparatus switches from the first state to the second state, the connection state of the expansion device and the processing device is capable of being maintained.

15 Claims, 8 Drawing Sheets

ELECTRONIC APPARATUS AND POWER SUPPLY METHOD

CROSS-REFERENCE TO RELATED APPLICATION

This application claims priority to Chinese Patent Application No. 202111163389.8, filed on Sep. 30, 2021, the content of which is incorporated herein by reference in its entirety.

TECHNICAL FIELD

The present disclosure generally relates to the power supply technology field and, more particularly, to an electronic apparatus and a power supply method.

BACKGROUND

As technology develops toward miniaturization and slimness, some functions of a processing device containing a power storage module can be removed or the performance of the processing device can be weakened. To enhance or improve the performance or the functions of the processing device, the processing device can be connected to an extension device configured to provide the processing device with extended functions and/or performance.

The processing device can be powered by an external power, which at the same time can also power the extension device. In response to the external power being cut off, the processing device can be powered by the power storage module in the processing device, but the extension device will be powered off, resulting in a brief disconnection between the processing device and the extension device. This then affects the application of the processing device.

SUMMARY

In accordance with the present disclosure, there is provided an electronic apparatus including a first component configured to connect to a processing device containing a power storage module, and a second component configured to connect to an extension device. The extension device is configured to provide the processing device with extended functions and/or performance. The electronic apparatus has at least a first state and a second state. In the first state, the electronic apparatus is connected to the processing device and the extension device, and an external power provides power to the processing device through the first component and provides power to the extension device. In the second state, the electronic apparatus is connected to the processing device and the extension device, and the electronic apparatus provides power to the extension device and the processing device provides power by the power storage module included in the processing device in response to the external power being cut off. After the electronic apparatus is switched from the first state to the second state, a connection between the extension device and the processing device is capable of being maintained.

Also in accordance with the present disclosure, there is provided a power supply method for an electronic apparatus. The method includes, in response to the electronic apparatus being in a first state, controlling the electronic apparatus to connect to a processing device and an extension device, to allow external power to provide power to the processing device through a first component of the electronic apparatus, and to allow the external power to provide power to the extension device. The method further includes, in response to the electronic apparatus being in a second state, controlling the electronic apparatus to connect to the processing device and the extension device, to allow power to be supplied to the extension device through a second component of the electronic apparatus and allow the processing device to be powered by a power storage module of the processing device in response to the external power being cut off. After the electronic apparatus is switched from the first state to the second state, a connection between the extension device and the processing device is capable of being maintained. The first component is connected to the processing device containing the power storage module, the second component is connected to the extension device, and the extension device is configured to provide extended functions and/or performance to the processing device.

Also in accordance with the present disclosure, there is provided a non-transitory computer-readable storage medium storing instructions that, when executed by a processor, cause the processor to, in response to an electronic apparatus being in a first state, control the electronic apparatus to connect to a processing device and an extension device, to allow external power to provide power to the processing device through a first component of the electronic apparatus, and to allow the external power to provide power to the extension device. The storing instructions, when executed by a processor, further cause the processor to, in response to the electronic apparatus being in a second state, control the electronic apparatus to connect to the processing device and the extension device, to allow power to be supplied to the extension device through a second component of the electronic apparatus and allow the processing device to be powered by a power storage module of the processing device in response to the external power being cut off. After the electronic apparatus is switched from the first state to the second state, a connection between the extension device and the processing device is capable of being maintained. The first component is connected to the processing device containing the power storage module, the second component is connected to the extension device, and the extension device is configured to provide extended functions and/or performance to the processing device.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Hereinafter, embodiments consistent with various embodiments of the present disclosure will be described with reference to drawings. It is apparent that the described embodiments are some but not all of the embodiments of the present disclosure. Based on the disclosed embodiments, persons of ordinary skill in the art can derive other embodiments consistent with various embodiments of the present disclosure, all of which are within the scope of the present disclosure.

In the present disclosure, description with reference to the terms "one embodiment," "some embodiments," "example," "specific example," or "some examples," etc., mean specific features, structures, materials, or characters described in connection with the embodiment or example are included in at least one embodiment or example of the present disclosure. Furthermore, the particular features, structures, materials or characteristics described can be combined in any suitable manner in any one or more embodiments or examples. Furthermore, those skilled in the art can combine the different embodiments or examples described in this specification, as well as the features of the different embodiments or examples, as long as they do not conflict with each other.

In the present disclosure, the terms "first" and "second" are only used for descriptive purposes, and should not be understood as indicating or implying relative importance or implying the number of indicated technical features. Thus, a feature associated with "first," "second" can expressly or implicitly include at least one of that feature. In the description of the present disclosure, "plurality" means two or more, unless otherwise expressly and specifically defined.

Figure 1:
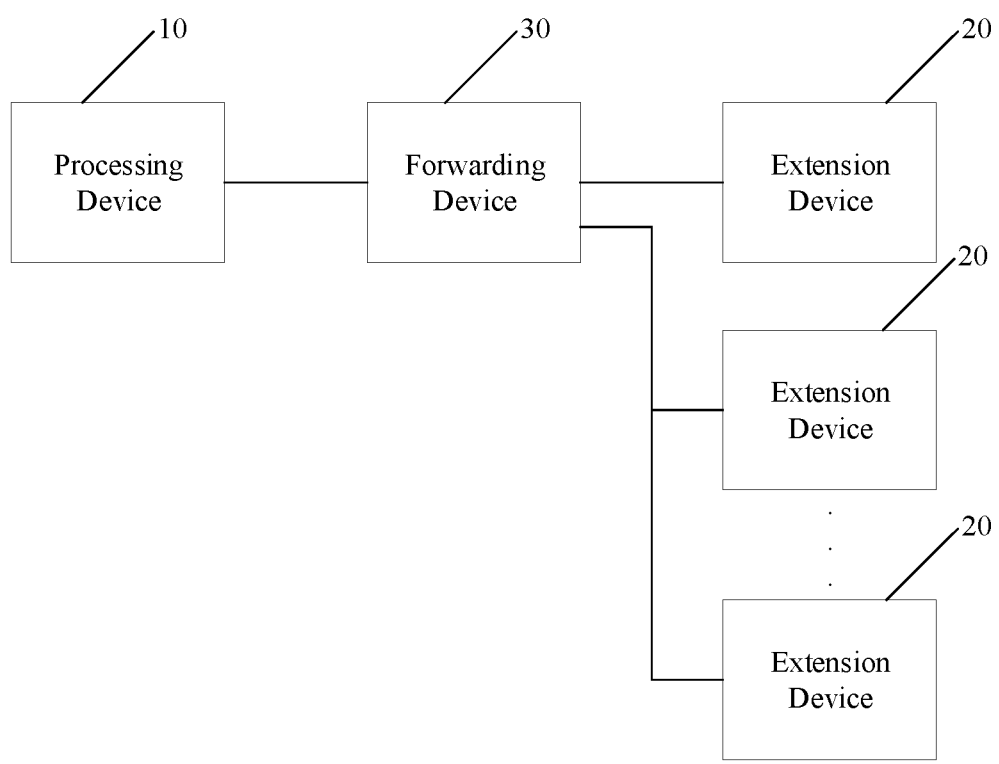
FIG. 1 illustrates a schematic diagram of an exemplary connection between a processing device and extension devices consistent with various embodiments of the present disclosure.

For a processing device containing a power storage module, the functions and/or performance of the processing device can be extended through an extension device. As shown in FIG. 1, a processing device 10 containing a power storage module is connected to an extension device(s) 20 through a forwarding device 30, so that a data transmission path can be established between the processing device and the extension device(s), thereby allowing the processing device to use the extension device(s).

An extension device can be a display screen, a hard drive, and the like. The display screen provides a display function for the processing device, and the storage performance of the processing device can be extended through the hard drive. In addition to serving as a connection between the processing device and the extension device, the forwarding device can also have a power transfer function. The forwarding device can be connected to external power and provide the power supplied by the external power to the extension device and the processing device. The processing device can operate under the power provided by the external power. Meanwhile, the power storage module in the processing device can also store power supplied by the external power.

If the external power is hot-swapped, the processing device can be powered by its power storage module, but the extension device does not have power storage capability. During the hot-swap process of the external power, the power in the forwarding device is not enough to support the use of the extension device such as the display screen and hard drive. This can then cause a brief power-off of the extension device. The data transmission path between the processing device and the extension device is also temporarily cut off, all of which affects the use of the processing device.

Embodiments of the present disclosure provide an electronic apparatus and a power supply method. The processing device and the extension device are connected through the electronic apparatus. After the electronic apparatus switches from a first state to a second state, the electronic apparatus can maintain the connection between the extension device and the processing device. For example, after switching from the first state to the second state, the electronic apparatus can maintain the data transmission path between the extension device and the processing device, thereby reducing the impact on the processing device.

Figure 2:
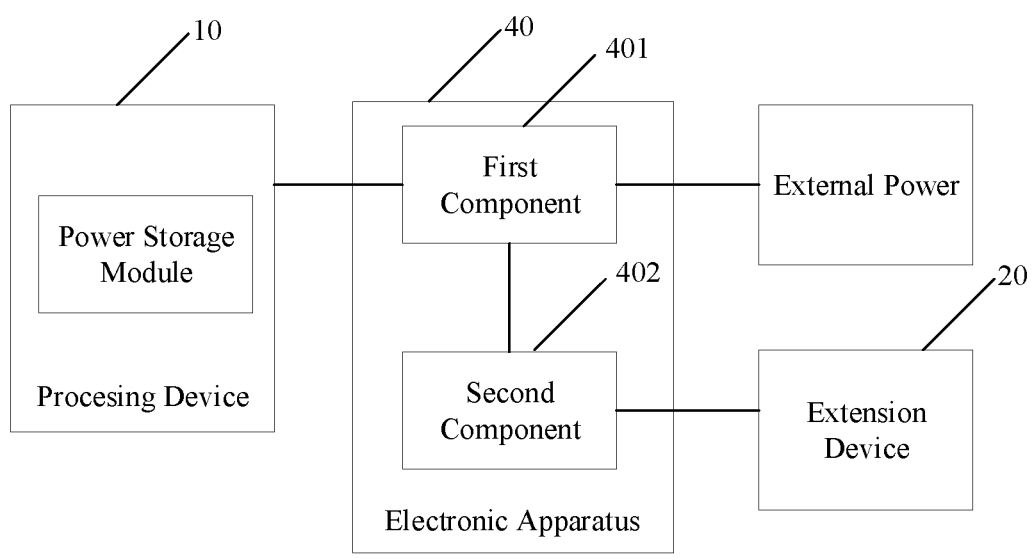
FIG. 2 illustrates a schematic structural diagram of an exemplary electronic apparatus consistent with various embodiments of the present disclosure.

FIG. 2 illustrates a schematic structural diagram of an exemplary electronic apparatus 40 consistent with various embodiments of the present disclosure. The electronic apparatus can include a first component 401 and a second component 402.

The first component 401 is configured to connect the processing device 10 containing a power storage module.

The second component 402 is configured to connect to the extension device 20. The extension device 20 is configured to provide the processing device 10 with extended functions and/or performance. The extension device 20 can provide display functions, communication functions, input functions, and the like to the processing device 10. For example, the extension device 20 can include a display screen, a docking station, a mouse and a keyboard, etc. Through the display screen, docking station, mouse and keyboard, and the like, the extension device 20 offers many different functions. The extension device 20 can also improve the performance of the processing device 10, e.g., improve the storage performance of the processing device. For that purpose, the extension device 20 can include a storage device such as a hard drive, and can use the storage device (e.g., the hard drive) to provide additional storage space for the processing device 10, to improve the storage performance of the processing device 10.

The electronic apparatus 40 has at least a first state and a different second state. In the first state, the electronic apparatus 40 is connected to the processing device 10 and the extension device 20. The external power provides power to the processing device 10 through a first component 401. The external power also provides power to the extension device 20 in response to the electronic apparatus being in the first state. In the second state, the electronic apparatus 40 connects the processing device 10 and the extension device 20, and provides power to the extension device 20 through a second component 102 in response to the external power being cut off. The processing device 10 obtains power through the power storage module contained in the processing device.

In other words, in the first state, the electronic apparatus 40 can be connected to the external power, which provides power to the processing device 10 through the first component 401. If the power storage module of the processing device 10 does not have power or the power is not in full, the power storage module of the processing device 10 can also be charged after power is supplied to the processing device 10 by the external power. In the first state, the power of the extension device 20 can also be provided by the external power. In one example, after the electronic apparatus 40 is connected to the external power, the electronic apparatus 40 converts the voltage of external power into a voltage usable by the extension device 20, and provides the converted power to the extension device 20.

In the second state, the external power is cut off, and thus the electronic apparatus 40 cannot provide power to the processing device through the first component 401. At this moment, the processing device 10 can provide power through its own internal power storage module. For the extension device 20, it can be powered by the second component 402. Therefore, even if the external power is cut off (e.g., in response to the electronic apparatus being in the second state), the extension device 20 is still in the powered state, and the extension device 20 will not lose the power.

In one example, the electronic apparatus 40 is a device with a power storage module (not shown in FIG. 2). In the second state, the electronic apparatus 40 can provide power to the extension device 20. Alternatively, in the second state, the processing device 10 containing a power storage module can provide power to the extension device 20 through the second component 402. However, no matter whether the electronic apparatus 40 or the processing device 10 provides power to the extension device 20, the extension device 20 is powered off after the power supply entity (either the electronic apparatus 40 or the processing device 10) runs out of power.

After the electronic apparatus 40 is switched from the first state to the second state, the connection between the extension device 20 and the processing device 10 is capable of being maintained. The reason why the connection between the extension device 20 and the processing device 10 is capable of being maintained is because after switching to the second state, the processing device 10 and the extension device 20 are both in a powered state. That is, for the processing device 10 and the extension device 20, whether during the process of or after switching the electronic apparatus to the second state, the processing device 10 and the extension device 20 do not lose power. The connection between the processing device 10 and the extension device 20 can thus be maintained. For example, at least the data transmission path between the processing device 10 and the extension device 20 remains consistently connected as the external power is shut off.

In the disclosed embodiments, the electronic apparatus includes a first component and a second component, where the first component is configured to connect with the processing device containing the power storage module, and the second component is configured to connect with the extension device. The extension device is configured to provide extended functions and/or performance to the processing device. The electronic apparatus has at least a first state and a second state. In the first state, the electronic apparatus is connected to the processing device and the extension device. The external power provides power to the processing device through the first component, and the external power also provides power to the extension device. In the second state, the electronic apparatus is still connected to the processing device and the extension device. In response to the external power being cut off, the extension device is powered through the second component, and the processing device is powered through the power storage module. After the electronic apparatus switches from the first state to the second state, the connection between the extension device and the processing device is capable of being maintained, so that the processing device can be connected to the extension device regardless of whether the electronic apparatus is in the first state or the second state. The connection between the processing device and the extension device thus will not be interrupted by state switching of the electronic apparatus, thereby reducing the impact on the use of the processing device caused by the state switching of the electronic apparatus.

The following describes one optional approach to provide power to the extension device through the second component in response to the electronic apparatus being in the second state. In the second state, the second component 402 in the electronic apparatus 40 provides the power stored in the processing device 10 to the extension device. The power stored by the processing device 10 is the power stored by the power storage module contained in the processing device 10.

Figure 3:
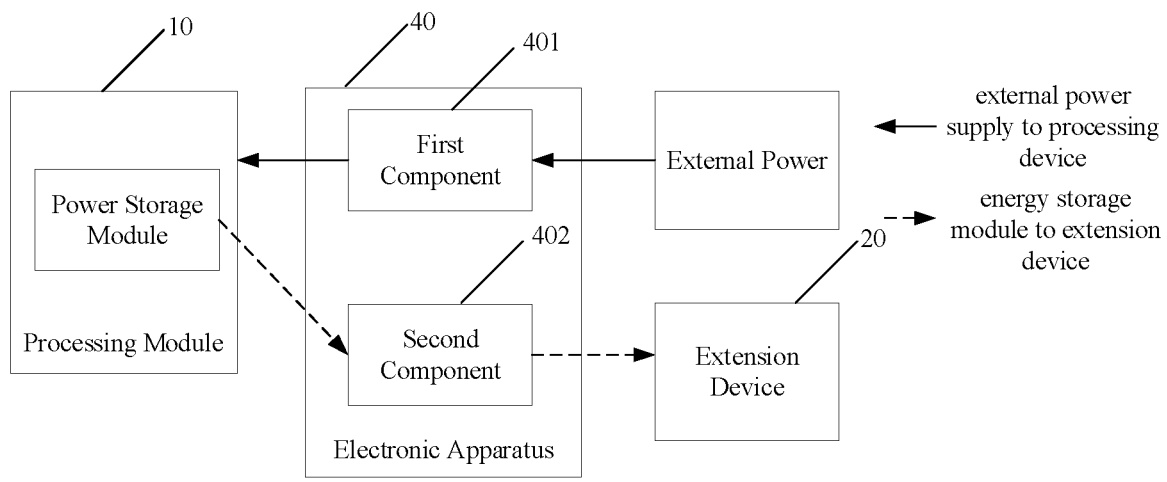
FIG. 3 illustrates a schematic diagram of exemplary power transmission flows in different states consistent with various embodiments of the present disclosure.

In the disclosed embodiments, in response to the electronic apparatus being in the first state, the power transmission flow can be as shown in FIG. 3. The external power provides power to the processing device 10 through the first component 401 in the electronic apparatus. The power storage module of the processing device 10 can provide power. Meanwhile, the external power can also provide power to the extension device 20. In response to the external power being cut off, the electronic apparatus switches from the first state to the second state. At this moment, the processing device 10 and the extension device 20 cannot receive power from the external power. The power storage module in the processing device 10 is switched from the charging state to the power supplying state, and thus the power storage module provides power to the processing device 10. Meanwhile, the power storage module of the processing device 10 can also output voltage to the second component 402 of the electronic apparatus, which then provides power to the extension device through the second component 402.

Figure 4:
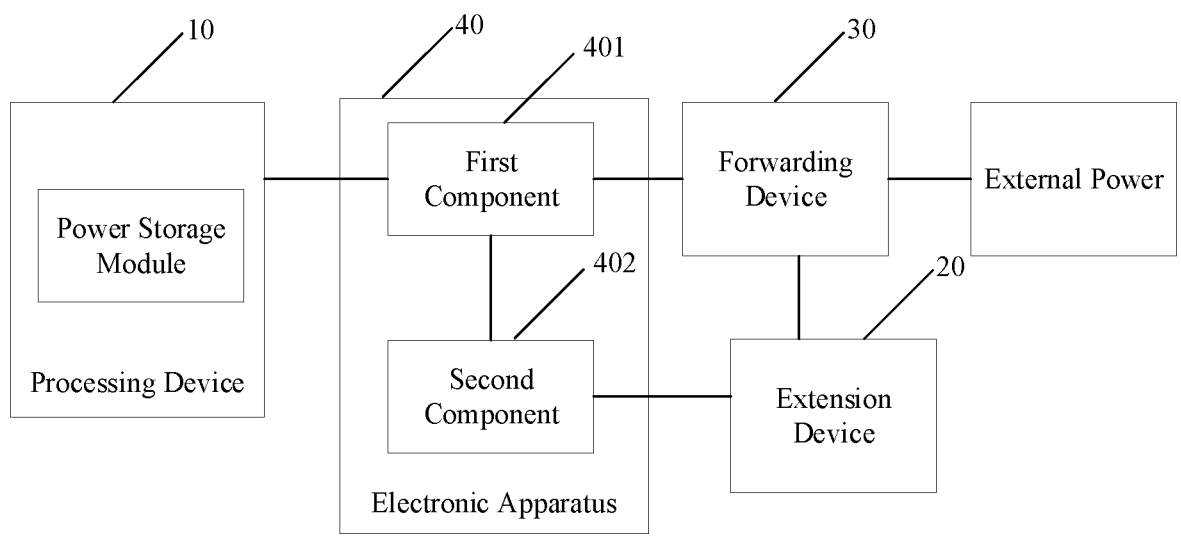
FIG. 4 illustrates a schematic diagram of an exemplary connection between different devices consistent with various embodiments of the present disclosure.

In order to be able to connect to the extension device 20, a forwarding device 30 can be introduced in the disclosed embodiment. A schematic diagram of the connection after the forwarding device 30 is introduced is shown in FIG. 4. In the figure, the forwarding device 30 is connected to the processing device 10 through the electronic apparatus 40, and the electronic apparatus 40 is connected to the extension device 20 through the forwarding device 30.

That is, the forwarding device 30 gets connected between the electronic apparatus 40 and the extension device 20, and the electronic apparatus 40 gets connected between the forwarding device 30 and the processing device 10. The external power can be connected to the forwarding device 30. In response to the electronic apparatus being in the first state, the forwarding device 30 can convert the voltage provided by the external power to the voltage required by the extension device 20 to provide power to the extension device 20.

The voltage provided by the external power source is provided to the processing device 10 through the first component 401 after passing through the forwarding device 30. As the external power provides power to the forwarding device 30 and as the first component 401 provides power to the processing device 10, the forwarding device 30 and/or the first component 401 can or can not adjust the power supply parameters. For example, if the voltage provided by the external power source does not meet the use of the processing device 10, the forwarding device 30 and/or the first component 401 can adjust the power supply parameters. If the voltage provided by the external power source meets the use of the processing device 10, the forwarding device 30 and the first component 401 do not adjust the power supply parameters. Alternatively, in response to the electronic apparatus being in the first state, the forwarding device 30 pass-throughs the power to the processing device 10. The processing device 10 can then provide power to the extension device 20. Therefore, the processing device 10 can be both a charging device and a power supply device at the same time.

In response to the electronic apparatus being in the second state, the forwarding device 30 has no external power access, so the forwarding device 30 cannot provide power to the extension device 20 or the internal power of the forwarding device can be insufficient to support the extension device 20. At this moment, the second component 402 can obtain power from the power storage module of the processing device, and provide power stored in the power storage module of the processing device to the extension device 20. The reason why the forwarding device 30 cannot provide power to the extension device 20 or its internal power is insufficient to support the extension device 20 is because the forwarding device 30 can not have a power storage module. In some embodiments, the forwarding device 30 can have a power storage module, but in the process of the electronic apparatus switching from the first state to the second state, the power transmission flow is still from the forwarding device 30 to the processing device 10. The power stored in the power storage module of the forwarding device is consumed by the processing device 10, and thus can be insufficient to support the use of the extension device 20.

In the disclosed embodiments, the electronic apparatus 40 can be used as an independent device, and can be connected to the forwarding device 30 in a detachable manner. Alternatively, the electronic apparatus 40 can be integrated into the forwarding device 30. The way of connection between the electronic apparatus 40 and the forwarding device 30 is not limited in the present disclosure.

Figure 5:
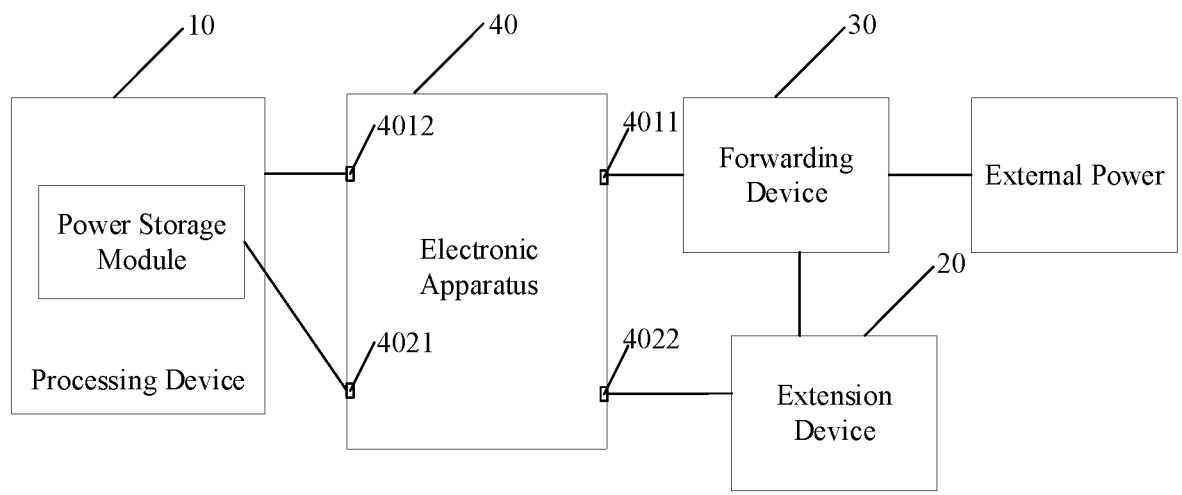
FIG. 5 illustrates a schematic diagram of another exemplary connection between different devices consistent with various embodiments of the present disclosure.

For the scenario where the second component 402 in the electronic apparatus 40 provides the power stored by the processing device 10 to the extension device, a schematic diagram of an exemplary electronic apparatus 40 is shown in FIG. 5. In FIG. 5, the first component 401 is a first interface, the second component 402 is a second interface. The forwarding device 30 also gets connected between the electronic apparatus 40 and the extension device 20, and the forwarding device 30 can also connect to the processing device 10 through the first interface. The external power provides power to the processing device 10 through the forwarding device 30 and the first interface, and the external power provides power to the extension device 20 through the forwarding device 30 (or the processing device 10 provides power to the extension device 20). The second interface can be connected to the extension device 20 through the forwarding device 30, and the power stored by the processing device 10 can be supplied to the extension device through the second interface and the forwarding device 30.

For example, in FIG. 5, the electronic apparatus 40 is used as a connection device, and its function is to pass-through power. The first interface includes a first external power input interface 4011 and a first external power output interface 4012, and the second interface includes a first bus power input interface 4021 and a first bus power output interface 4022.

The first external power input interface 4011 is connected to the forwarding device 30, and the first external power output interface 4012 is connected to the processing device 10. The power provided by the external power is sequentially transmitted to the processing device 10 through the forwarding device 30, the first external power input interface 4011 and the first external power output interface 4012 to provide power to the processing device 10. The first bus power input interface 4021 is connected to the processing device 10, and the first bus power output interface 4022 is connected to the forwarding device 30. The output end of the power storage module of the processing device 10 can be connected to the first bus power input interface 4021. In the second state, the power output by the power storage module of the processing device 10 sequentially passes through the first bus power input interface 4021, the first bus power output interface 4022 and the forwarding device 30 to the extension device 20.

In the embodiment shown in FIG. 5, the electronic apparatus 40 is used as a connecting device, and two pairs of interfaces are symmetrically deposed on both sides of the connecting device. One pair of interfaces is related to the external power, and the other pair of interfaces is related to the bus power supply, so that the interfaces for providing external power to the processing device 10 and the interfaces for the processing device to provide power to the extension device 20 are separated. During the hot-plug process of the external power, the processing device 10 can provide power to the extension device 20 through the relevant interfaces as a power supply source. This solves the problem of the insufficient power required by the extension device 20 caused by the shut off of the external power, and can provide power to the extension device in a timely manner in response to the external power being cut off. The connection between the processing device 10 and the extension device 20 can thus be maintained.

It should be noted that the first interface also includes a first external power grounding interface, which is grounded to form a loop, and the second interface also includes a first bus power supply grounding interface, which is grounded to form a loop. The first external power ground interface and the first bus power ground interface are not shown in FIG. 5.

The power storage module of the processing device 10 can be a charging circuit, which can use the first external power input interface to receive the voltage provided by the external power source, and output a first voltage through the charging circuit. After the first voltage passes through the voltage converter in the processing device 10, a stable second voltage is output. The stable second voltage can be provided to the extension device 20 through the first bus power input interface.

In the disclosed embodiments, the electronic apparatus 40 can be detachably connected to the forwarding device through the first interface and the second interface, as shown in FIG. 5. Apparently, the electronic apparatus 40 can also be integrated into the forwarding device. After being integrated into the forwarding device 30, the execution process of the electronic apparatus 40 can be similar to the above described process, details of which are not repeated here.

For the scenario where the second component 402 in the electronic apparatus 40 provides the power stored by the processing device 10 to the extension device, the electronic apparatus is used as a connection device, to separate the interface for supplying power to the processing device and the interface for supplying power to the extension device. The processing device can be used as a power source when supplying power to the extension device. In order to prevent the disconnection between the processing device and the extension device, the electronic apparatus just gets connected between the processing device and the forwarding device as the connecting device. In addition, corresponding interface modules just need to be added to the processing device and the forwarding device. This can limit the remodeling of the processing device and the forwarding device when maintaining the connection between the processing device and the extension device.

Figure 6:
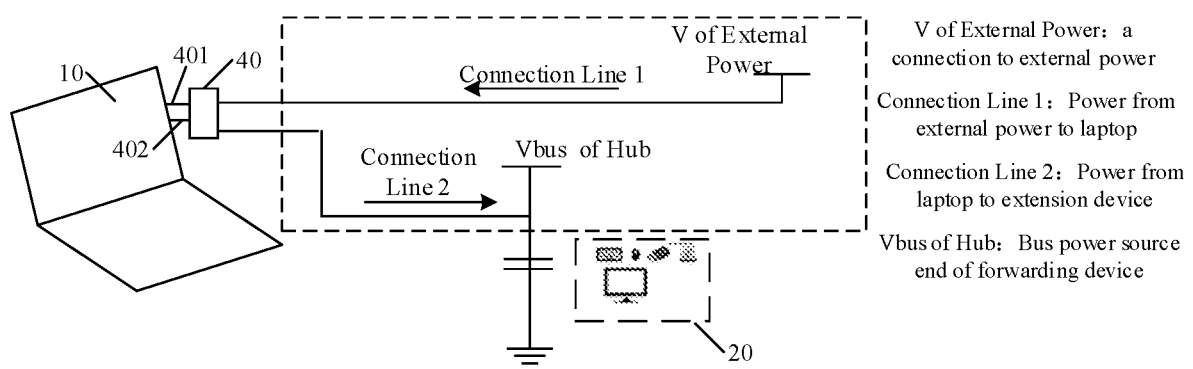
FIG. 6 illustrates a schematic diagram of still another exemplary connection between different devices consistent with various embodiments of the present disclosure.

For example, as shown in FIG. 6, the processing device 10 is a laptop, and the electronic apparatus 40 is used as a connecting device. One side of the connecting device is connected to the laptop, and the other side is connected to the forwarding device 30. The forwarding device 30 is connected with the extension device 20 such as keyboard, mouse, flash drive and/or display screen. In order to connect the laptop and the forwarding device to the electronic apparatus 40, interfaces matching the first interface and the second interface in the electronic apparatus 40 are provided on the laptop and the forwarding device, so that the electronic apparatus can be plugged in between the laptop and the forwarding device.

After the forwarding device 30 is connected to the external power, the power provided by the external power source is transmitted to the laptop for use through the forwarding device 30 and the first interface of the electronic apparatus 40. While the laptop is in use, the laptop can provide the power to the extension device 20 through the second interface of the electronic apparatus and the forwarding device. If the external power is cut off, the laptop can provide power through its own battery (which is a power storage module) when maintaining the power supply to the extension device. Neither the laptop nor the extension device will lose power, thus maintaining the connection between the laptop and the extension device.

As the laptop and the forwarding device use the electronic apparatus provided in the disclosed embodiments, the laptop and the forwarding device can add interfaces matching the electronic apparatus. The interfaces can be added in the form of an extension interface, so that the laptop and the forwarding device can maintain the original structure unchanged. Alternatively, the interfaces of the laptop and the forwarding device can be modified, and the power supply line matching the interfaces is also modified, both of which are quite easy to achieve.

Figure 7:
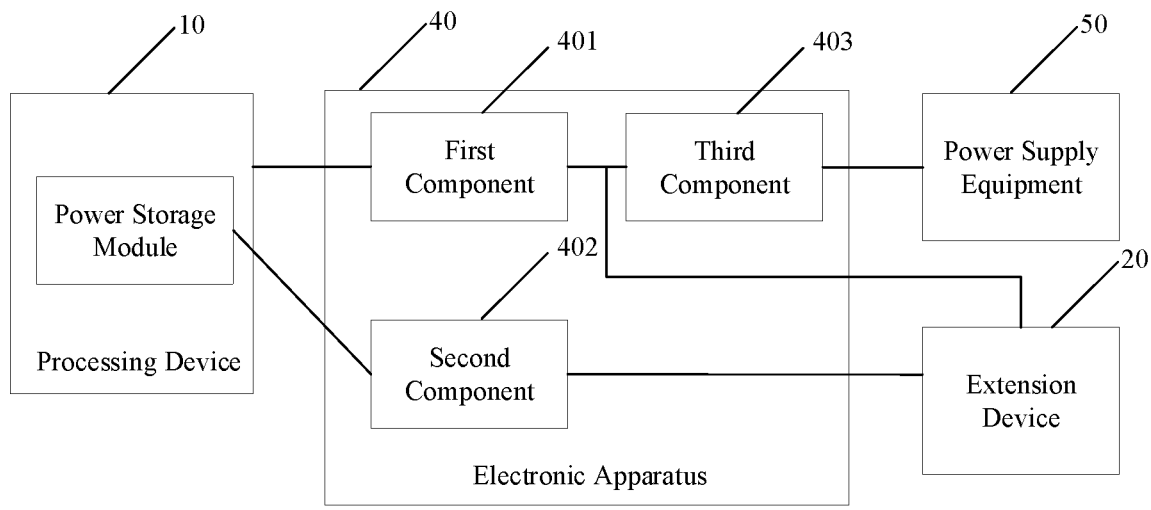
FIG. 7 illustrates a schematic structural diagram of another exemplary electronic apparatus consistent with various embodiments of the present disclosure.

FIG. 7 shows another optional structure of the electronic apparatus consistent with various embodiments of the present disclosure. On the basis of the structure shown in FIG. 2, the electronic apparatus can further include a third component 403 for connecting a power supply equipment, which can provide power to the processing device. In the first state, the electronic apparatus is connected to the processing device, the power supply equipment and the extension device. In the second state, the electronic apparatus is connected to the processing device and the extension device.

The power supply equipment can be an AC-DC conversion device, which converts the AC power provided by the external power source into DC power, and then provides the power to the processing device 10 through the third component 403 and the first component 401 in sequence.

In the disclosed form of electronic apparatus shown in FIG. 7, the first component 401 is the third interface, the second component 402 is the fourth interface, and the third component 403 is the fifth interface.

The fifth interface is configured to connect the power supply equipment 50. The third interface is configured to provide the power output by the power supply equipment to the processing device in response to the electronic apparatus being in the first state. For example, the power provided by the power supply equipment 50 is provided to the processing device 10 sequentially through the fifth interface and the third interface. In the first state, the power supply equipment 50 can also provide power to the extension device 20 through the electronic apparatus. The fourth interface is configured to provide the power stored by the processing device 10 to the extension device 20 in response to the electronic apparatus being in the second state. For example, the power stored by the power storage module of the processing device 10 is provided to the extension device in response to the electronic apparatus being in the second state.

For example, the electronic apparatus shown in FIG. 7 can be a forwarding device, which is connected between the processing device and the power supply equipment. The forwarding device is also connected with an extension device to provide extended functions and/or performance to the processing device. In the first state, the forwarding device can convert the power provided by the power supply equipment into the power required by the extension device. In the second state, the forwarding device provides power stored in the power storage module of the processing device to the extension device through the fourth interface (e.g., the second component), which is similar to the aforementioned use of the electronic apparatus as a connecting device, detail of which will not be repeated here.

In the disclosed embodiments, another form of electronic apparatus shown in FIG. 7 is that the third component 403 is a sixth interface for connecting to the power supply equipment. The second component 402 includes a seventh interface and a power storage and supply module. The seventh interface is configured to connect to the extension device. The power storage and supply module is configured to store energy in response to the power supply equipment providing power to the processing device, and is configured to provide power to the extension device in response to the electronic apparatus being in the second state.

Figure 8:
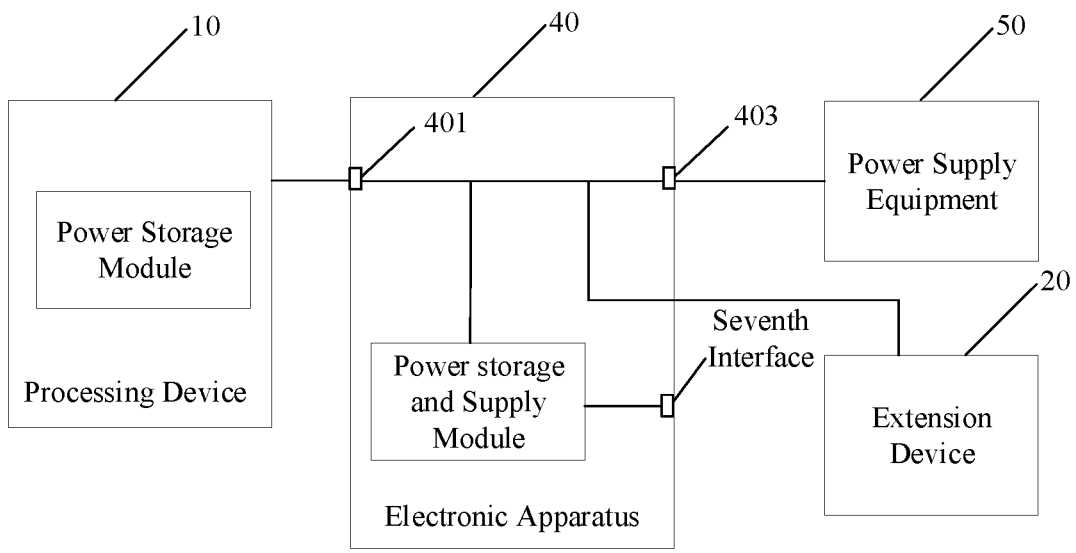
FIG. 8 illustrates a schematic diagram of still another exemplary connection between different devices consistent with various embodiments of the present disclosure.

The schematic diagram of the connection between this form of electronic apparatus, the processing device and the extension device is shown in FIG. 8. The first component 401 can also be an interface, the processing device 10 is connected through the first component, the power supply equipment 50 is connected through the sixth interface, and the extension device 20 is connected through the seventh interface.

In the first state, the power output by the power supply equipment 50 is provided to the processing device 10 through the third component and the first component in sequence. Meanwhile, the power output by the power supply equipment 50 can also be provided to the extension device 20 through the third component and the seventh interface of the second component in sequence. The power storage and supply module in the second component starts to store energy. In the second state, no power supply equipment is connected to the third component 403. Neither the processing device 10 nor the extension device 20 can obtain power through the power supply equipment. In the second state, the processing device 10 can provide power through its own power storage module, but the extension device 20 does not have the power storage function. At this moment, the power storage module in the electronic apparatus 40 can provide power to the extension device 20.

In the first state, the power storage and supply module starts to store energy, indicating that the power storage and supply module is connected to the power transmission path of the first component and the third component. In this manner, the power storage and supply module can obtain the power provided by the power supply equipment through the power transmission path, and then charge itself. However, there is a problem with this connection: in the process of switching the electronic apparatus from the first state to the second state, the power of the power storage and supply module is output to the processing device 10. The processing device 10 will consume the power stored in the power storage and supply module. The processing device 10, as a high-load device, can quickly consume the power stored in the power storage and supply module in a short period of time, which can cause the power stored in the power storage and supply module to be insufficient to support the extension device 20.

Figure 9:
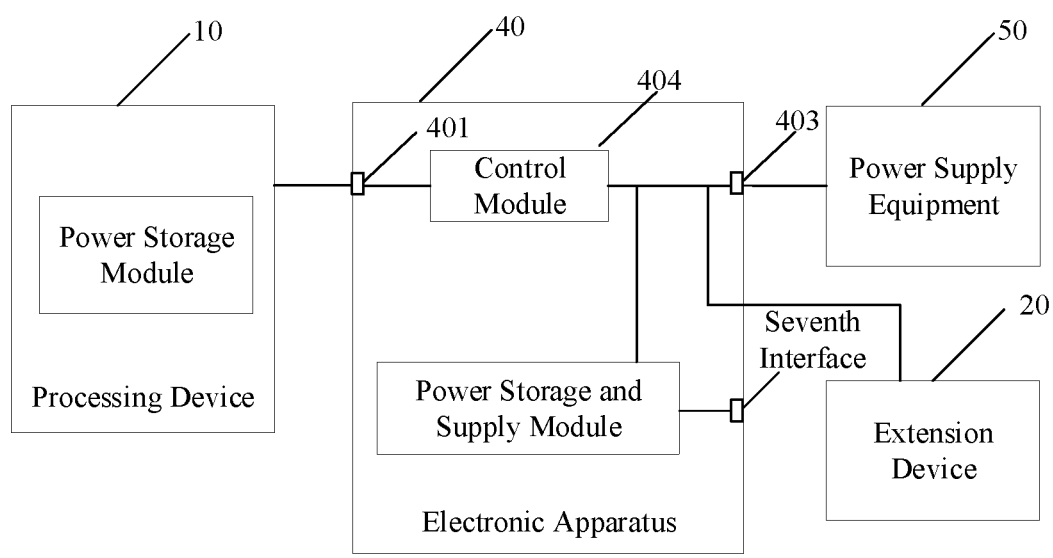
FIG. 9 illustrates a schematic structural diagram of still another exemplary electronic apparatus consistent with various embodiments of the present disclosure.

In view of this problem, in the disclosed embodiments, a control module 404 is provided on the power transmission path connecting the first component 401 and the third component 403, as shown in FIG. 9. In the electronic apparatus shown in FIG. 9, the power storage and supply module is connected to the power transmission path to store energy as the power supply equipment provides power to the processing device.

The control module 404 is configured to turn on the power transmission path if the power supply equipment provides power to the processing device, and to turn off the power transmission path if the power supply equipment is cut off from the third component, so as to control the flow of the power, output by the power storage and supply module, to the extension device.

In other words, after the power supply equipment 50 is cut off from the third component 403, the control module 404 quickly turns off the power transmission path, to switch the power from flowing to the processing device 10 to flowing to the extension device 20, which then timely reduces the consumption of the power, stored in the power storage and supply module of the electronic apparatus, by the processing device 10.

In the disclosed embodiments, the control of the power transmission flow by the control module 404 can be implemented in, but not limited to, the following two ways.

In a first implementation, the control module 404 includes a switch disposed on the power transmission path. The switch is in an on state in response to the power supply equipment providing power to the processing device, and in an off state in response to the power supply equipment being cut off from the third component. The power storage and supply module is disposed between the switch and the third component 403. The connection between the power storage and supply module and the processing device 10 is turned off after the switch is in an off state, so as to prevent the processing device 10 from consuming the power stored in the power storage and supply module. In addition, by including a switch on the power transmission path, costs and size requirements for the electronic apparatus can be reduced.

For example, in the disclosed embodiments, the forwarding device shown in FIG. 1 can be modified. The first component, second component, third component, control module, and the like are configured in the forwarding device. In response to the forwarding device being in the second state, the power storage and supply module in the second component is controlled by the switch in the control module. The first component and the third component can be interfaces/pins, etc. Putting the interfaces, power storage and supply modules and switches in the forwarding device can reduce the cost of remodeling the forwarding device. In addition, these components do not occupy much space, thereby reducing the size requirements for the forwarding device.

In a second implementation, the control module 404 includes a first switch tube 1, a second switch tube 2 and a control circuit 3. The control circuit 3 is disposed between the first switch tube 1 and the second switch tube 2. The first switch tube 1 is disposed on the power transmission path. The second switch tube 2 is configured to be in an on state in response to the power supply equipment being cut off from the third component, and is configured to keep the control circuit 3 control the first switch tube 1 to be in an off state. The second switch tube 2 is also configured to be in an off state in response to the power supply equipment providing power to the processing device, and is configured to keep the control circuit 3 control the first switch tube 1 to be in on state. This then allows control of the power transmission through the state switching of the second switch tube 2 and the first switch tube 1.

Figure 10:
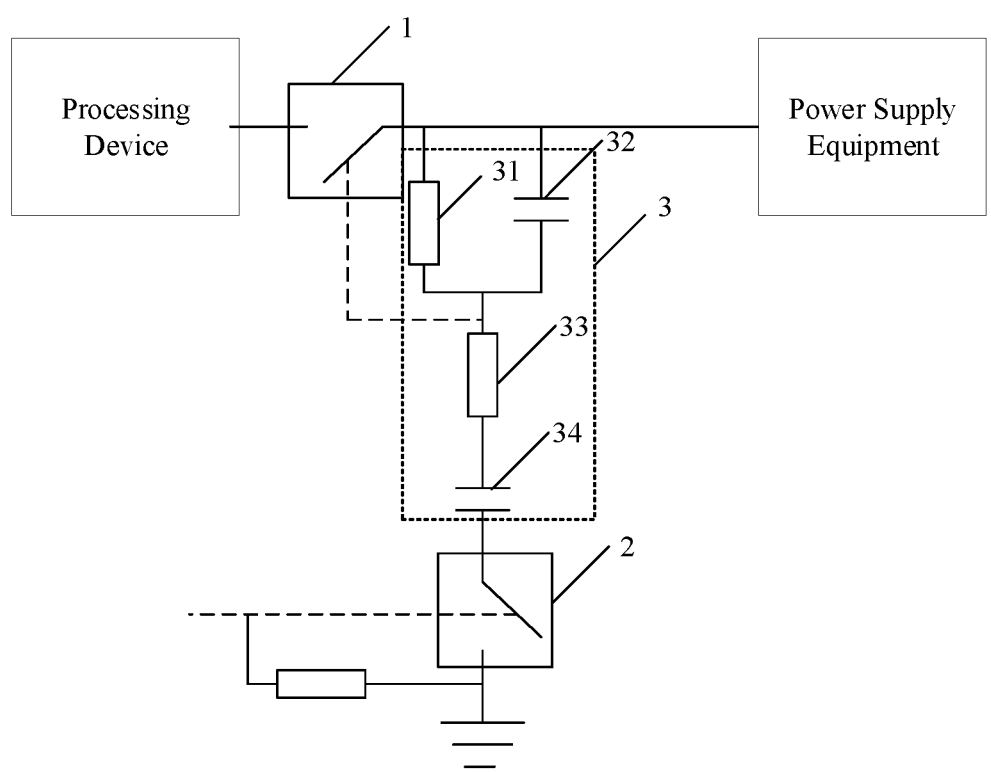
FIG. 10 illustrates a circuit diagram of an exemplary control module consistent with various embodiments of the present disclosure.

In the disclosed embodiments, the composition and connection of the first switch tube 1, the second switch tube 2 and the control circuit 3 can refer to FIG. 10. The first end of the first switch tube 1 is connected to the third component, the second end of the first switch tube 1 is connected to the first component, and the third end of the first switch tube 1 is connected to the control circuit 3. The control circuit 3 controls the state of the first switch tube 1 by controlling the voltage of the third end of the first switch tube 1.

The control circuit 3 includes a first resistor 31, a first capacitor 32, a second resistor 33 and a second capacitor 34.

The first resistor 31 and the first capacitor 32 are connected in parallel to form a charging and discharging circuit. The first resistor 31, the second resistor 33 and the second capacitor 34 are connected in series, and the second resistor 33 is located between the first resistor 31 and the second capacitor 34.

One end of the first resistor 31 is connected to the first end of the first switch tube 1, and the third end of the first switch tube 1 is connected to the other end of the first resistor 31. The first end of the second switch tube 2 is connected to the first end of the second capacitor 34, the second end of the second switch tube 2 is grounded. The third end of the second switch tube 2 is connected to an external voltage signal. The first end of the second capacitor 34 is a port of the second capacitor 34 that is not connected to the second resistor 33.

The external voltage signal is configured to keep the second switch tube 2 in an on state as the power supply equipment is cut off from the third component, and keep the first switch tube 1 in an off state as the second switch tube 2 is in an on state. The external voltage signal is also configured to keep the second switch tube 2 in an off state in response to the power supply equipment providing power to the processing device, and keep the first switch tube 1 in an on state in response to the second switch tube 2 being in an off state.

One control logic for the electronic apparatus shown in FIG. 10 is that when the electronic apparatus detects that the power supply equipment is cut off from the third component, for example, after the power supply equipment is pulled out, the third end of the second switch tube 2 inputs an external voltage signal. The external voltage signal can control the second switch tube 2 to be in an on state. The voltage of the connection point between the first resistor 31 and the second resistor 33 drops to 0V, so that the first switch tube 1 is in an off state, and the power transmission path is in an off state. When the power transmission path is in an off state, the power in the power storage and supply module will not flow to the processing device. In this way, the power transmission path can be timely turned off, so that the power storage and supply module can save more power for itself and the extension device. This allows the extension device (e.g., monitor and flash drive, etc.) to not lose power.

If the control module 404 is configured to assist the forwarding device to maintain the connection between the processing device and the extension device, it can be achieved by just adding multiple switches, multiple resistors and multiple capacitors to the forwarding device. These switches, resistors and capacitors are small in size and low in cost. Adding multiple switches, resistors and capacitors to the forwarding device will not greatly increase the cost of the forwarding device, nor will it greatly increase the product size of the forwarding device. Compared with connecting multiple high-capacity tantalum capacitors in parallel in the power storage and power supply module of the forwarding device, it can reduce the remodeling cost and reduce the size requirements of the forwarding device.

In addition, by reducing the resistance value of the resistors, the discharge time of the charging and discharging circuit is shortened, and thus the first switch tube can be quickly turned off. The power transmission path connecting the processing device 10 is then turned off, and the processing device 10 can no longer consume the power on the forwarding device. The forwarding device can thus reserve more power for the extension device to use. In the disclosed embodiments, the state switching of the first switch tube will not be affected by the switching speed of the processing device. In other words, whether the switching of the processing device from the external power to the power supply of the power storage module is fast or slow, the first switch tube can be quickly switched from the on state to the off state after the external power is shut off, so as to avoid the quick consumption of power, stored in the forwarding device, by the processing device. The parallel connection of multiple high-capacity tantalum capacitors will cause a high probability of recurrence when the switching of the processing device from the external power to the power supply of the power storage module is slow. Compared with this, the disclosed embodiments can improve higher accuracy.

Figure 11:
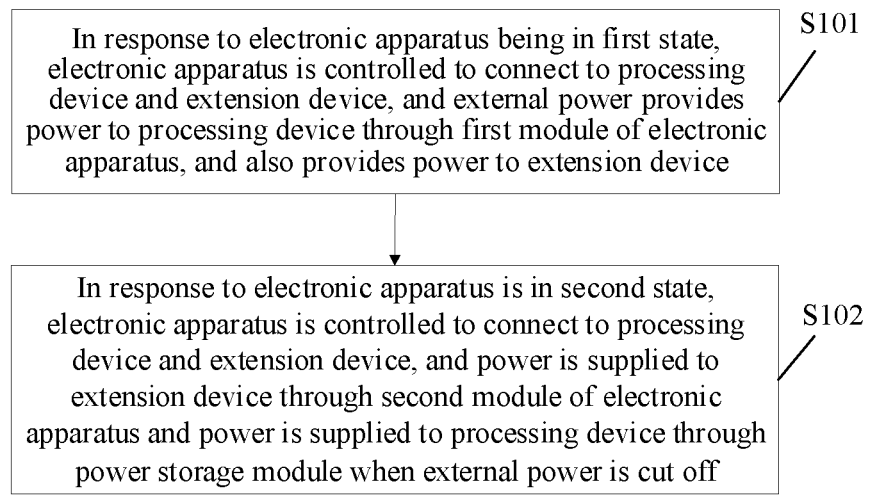
FIG. 11 illustrates a flow chart of an exemplary power supply method consistent with various embodiments of the present disclosure.

Consistent with the above-described device embodiments, embodiments of the present disclosure further provide a power supply method, the process of which is shown in FIG. 11. The method can include the following steps:

S101: In a first state of the electronic apparatus, control the electronic apparatus to connect to the processing device and the extension device, to allow external power to provide power to the processing device through the first component of the electronic apparatus, and to allow the external power to provide power to the extension device.

S102: In a second state of the electronic apparatus, control the electronic apparatus to connect to the processing device and the extension device, to allow power to be provided to the extension device through the second component of the electronic apparatus, and to allow power to be provided to the processing device by a power storage module of the processing device in response to the external power being cut off.

In the disclosed method, after the electronic apparatus is switched from the first state to the second state, the connection between the extension device and the processing device is capable of being maintained. The first component of the electronic apparatus is connected to the processing device containing the power storage module, and the second component of the electronic apparatus is connected to the extension device. The extension device is configured to extend functions and and/or performance of the processing device.

In the disclosed embodiments, in response to the external power being cut off, the way to provide power to the extension device through the second component of the electronic apparatus can include, but is not limited to, the following approaches:

In a first approach, in response to the external power being cut off, the power stored by the processing device is provided to the extension device through the second component. For example, the power stored by the power storage module in the processing device is provided to the extension device.

For example, the first component is the first interface, and the second component is the second interface. A forwarding device is also connected between the electronic apparatus and the extension device. The forwarding device is connected to the processing device through the first interface. The external power provides power to the processing device through the forwarding device and the first interface, and provides power to the extension device through the forwarding device.

The second interface is connected to the extension device through the forwarding device. The power stored by the processing device is provided to the extension device through the second interface and the forwarding device.

In the first approach, the electronic apparatus is detachably connected to the forwarding device. For example, the first interface and the second interface are detachably connected to the forwarding device. For the description of the first interface and the second interface, refer to the device embodiments described earlier. Alternatively, the electronic apparatus can be also integrated into the forwarding device. In this manner, the forwarding device is connected with the processing device through the electronic apparatus, and the electronic apparatus is connected with the extension device through the forwarding device.

In a second approach, the electronic apparatus further includes a third component for connecting to a power supply equipment. The power supply equipment can provide power to the processing device. In the first state, the electronic apparatus is connected to the processing device, the power supply equipment and the extension device. In the second state, the electronic apparatus is connected to the processing device and the extension device.

Here, the first component is the third interface, the second component is the fourth interface, and the third component is the fifth interface. In the first state, the fifth interface is connected to the power supply equipment. In the first state, the third interface will provide power output by the power supply equipment to the processing device. In the second state, the fourth interface provides the power stored in the processing device to the extension device.

In a third approach, the electronic apparatus further includes a third component for connecting to the power supply equipment. The power supply equipment can provide power to the processing device. In the first state, the electronic apparatus connects the processing device, the power supply equipment and the extension device. In the second state, the electronic apparatus connects to the processing device and the extension device.

Here, the third component is the sixth interface, which is configured to connect to the power supply equipment. The second component includes a seventh interface and a power storage and supply module. The seventh interface is configured to connect to the extension device. The power storage and supply module stores energy in response to the power supply equipment providing power to the processing device in the first state. The power storage and supply module also provides power to the extension device in response to being in the second state.

In the third approach, a control module is disposed on the power transmission path connecting the first component with the third component. The power storage and supply module is connected with the power transmission path, so as to store energy as the power supply equipment provides power to the processing device. The control module turns on the power transmission path as the power supply equipment provides power to the processing device, and turns off the power transmission path in response to the power supply equipment being cut off from the third component, so as to control the flow of power, output by the power storage and supply module, to the extension device.

The control module includes a switch disposed on the power transmission path. The switch is in an on state in response to the power supply equipment providing power to the processing device, and is in an off state in response to the power supply equipment being cut off from the third component.

The control module includes a first switch tube, a second switch tube and a control circuit. The control circuit is disposed between the first switch tube and the second switch tube. The first switch tube is deposed on the power transmission path. The second switch tube is configured to be in an on state, and is configured to keep the control circuit control the first switch tube to be in an off state in response to the power supply equipment being cut off from the third component. The second switch tube is also configured to be in an off state, and is configured to keep the control circuit control the first switch tube to be in an on state in response to the power supply equipment providing power to the processing device.

The configurations of the first switch tube, the second switch tube and the control circuit can be as follows:

The first end of the first switch tube is connected to the third component, the second end of the first switch tube is connected to the first component, and the third end of the first switch tube is connected to the control circuit. The control circuit controls the state of the first switch tube through controlling the voltage of the third end of the first switch tube.

The control circuit includes a first resistor, a first capacitor, a second resistor and a second capacitor. The first resistor and the first capacitor are connected in parallel to form a charging and discharging circuit. The first resistor, the second resistor and the second capacitor are connected in series, and the second resistor is disposed between the first resistor and the second capacitor. One end of the first resistor is connected to the first end of the first switch tube, and the third end of the first switch tube is connected to the other end of the first resistor. The first end of the second switch tube is connected to the first end of the second capacitor. The second end of the second switch tube is grounded, and the third end of the second switch tube is connected to an external voltage signal. The first end of the second capacitor is a port that is not connected to the second resistor. The external voltage signal is configured to keep the second switch tube to be in an on state in response to the power supply equipment being cut off from the third component, and keep the first switch tube in an off state in response to the second switch tube being in an on state. The external voltage signal is also configured to keep the second switch tube to be in an off state in response to the power supply equipment providing power to the processing device, and keep the first switch tube in an on state in response to the second switch tube being in an off state.

Embodiments of the present disclosure further provide a storage medium, where computer program codes are stored in the storage medium. The aforementioned power supply methods are implemented when the computer program codes are executed.

In the present disclosure, the terms "comprising," "including" or any other variation thereof are intended to encompass a non-exclusive inclusion such that a process, method, article or device comprising a list of elements includes not only those elements, but also others not expressly listed elements, or also include elements inherent to such a process, method, article or apparatus. Without further limitation, an element qualified by the phrase "comprising a." does not preclude the presence of additional identical elements in a process, method, article or apparatus that includes the element.

In the embodiments provided in the present disclosure, it should be understood that the disclosed system, device, and method can be implemented in other ways. For example, the device embodiments described above are only illustrative. For example, the division of the units is only a logical function division, and there can be other divisions in actual implementation. For example, multiple units or components can be combined or can be integrated into another system, or some features can be ignored or not implemented. In addition, the displayed or discussed mutual coupling or direct coupling or communication connection can be indirect coupling or communication connection through some interfaces, devices or units, and can also be electrical, mechanical or other forms of connection.

The units described as separate components can or cannot be physically separated, and the components displayed as units can or cannot be physical units, that is, they can be located in one place, or they can be distributed on multiple network units. Some or all of the units can be selected according to actual needs to achieve the objectives of the solutions of the embodiments of the present disclosure.

In addition, the functional units in the various embodiments of the present disclosure can be integrated into one processing unit, or each unit can exist alone physically, or two or more units can be integrated into one unit. The aforementioned integrated unit can be implemented in the form of hardware or software functional unit.

A person of ordinary skill in the art can be aware that all or some of the processes in the method embodiments of the present disclosure can be implemented by hardware related to the program instructions. The program can be stored in a non-transitory computer-readable storage medium. When the program is executed, the processes of the method embodiments can be executed. The aforementioned storage medium includes: a mobile storage medium, a read-only memory (ROM), a magnetic disk, an optical disk, or another medium that can store program codes.

When the integrated unit is implemented in the form of a software functional unit and sold or used as an independent product, it can be stored in a non-transitory computer-readable storage medium. Based on this understanding, all or part of the technical solution can be embodied in the form of a software product. The computer software product is stored in a storage medium, and includes several instructions to enable a computer device (which can be a personal computer, a server, or a network device, etc.) to perform all or some of the processes of the method described in each embodiment of the present disclosure. The aforementioned storage medium includes: a mobile storage medium, a read-only memory (ROM), a magnetic disk, an optical disk, or another medium that can store program codes.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but can be embodied in other equivalent forms without departing from the scope of the present disclosure.

What is claimed is:

1. An electronic apparatus comprising:
   a first component, configured to connect to a processing device containing a power storage module;
   a second component, configured to connect to an extension device, wherein the extension device is configured to provide the processing device with extended functions and/or performance; and
   a third component connected to the first component through a power transmission path, a control module being disposed on the power transmission path, and the third component being connected to an external power, wherein:
      the electronic apparatus has at least a first state and a second state, in the first state, the electronic apparatus is connected to the processing device and the extension device, and the external power provides power to the processing device through the first component and provides power to the extension device, and in the second state, the electronic apparatus is connected to the processing device and the extension device, and the electronic apparatus provides power to the extension device and the processing device provides power by the power storage module included in the processing device in response to the external power being cut off;
      after the electronic apparatus is switched from the first state to the second state, a connection between the extension device and the processing device is capable of being maintained; and
      the control module is configured to turn on the power transmission path in response to the external power providing power to the processing device, and turn off the power transmission path in response to the external power being cut off from the third component;
      the control module comprises a first switch tube disposed on the power transmission path, a second switch tube, and a control circuit, wherein the control circuit is disposed between the first switch tube and the second switch tube; and
      the second switch tube is configured to be in an on state and keep the control circuit control the first switch tube in an off state in response to the external power being cut off from the third component, and is configured to be in an off state and keep the control circuit control the first switch tube in an on state in response to the external power providing power to the processing device.

2. The electronic apparatus according to claim 1, wherein:
   the second component of the electronic apparatus provides power stored in the processing device to the extension device;
   the electronic apparatus is detachably connected to a forwarding device, or the electronic apparatus is integrated into the forwarding device; and
   the forwarding device is connected to the processing device through the electronic apparatus, and the electronic apparatus is connected to the extension device through the forwarding device.

3. The electronic apparatus according to claim 1, wherein the first component is a first interface, the second component is a second interface, a forwarding device is connected between the electronic apparatus and the extension device, the forwarding device is connected to the processing device through the first interface, the external power provides power to the processing device through the forwarding device and the first interface, and the external power provides power to the extension device through the forwarding device; and
   where the second interface is connected to the extension device through the forwarding device, and provides power stored in the processing device to the extension device through the second interface and the forwarding device.

4. The electronic apparatus according to claim 1, wherein the first component is a third interface, the second component is a fourth interface, the electronic apparatus further comprises a third component, and the third component is a fifth interface configured to connect to a power supply equipment that provides power to the processing device;
   the third interface is configured to provide power output by the power supply equipment to the processing device in response to the electronic apparatus being in the first state; and
   the fourth interface is configured to provide power stored in the processing device to the extension device in response to the electronic apparatus being in the second state,
   wherein, in the first state, the electronic apparatus is connected to the processing device, the power supply equipment and the extension device, and in the second state, the electronic apparatus is connected to the processing device and the extension device.

5. The electronic apparatus according to claim 1, wherein the third component is a sixth interface configured to connect to a power supply equipment, and wherein,
   the second component comprises a seventh interface and a power storage and supply module, wherein the seventh interface is configured to connect to the extension device, and the power storage and supply module is configured to store power in response to the power supply equipment providing power to the processing device, and provide power to the extension device in response to the electronic apparatus being in the second state; and in response to being in the first state, the electronic apparatus is connected to the processing device, the power supply equipment and the extension device, and in response to being in the second state, the electronic apparatus is connected to the processing device and the extension device.

6. The electronic apparatus according to claim 5, wherein the power storage and supply module is connected to the power transmission path, so as to store power while the power supply equipment providing power to the processing device; and the control module is configured to turn on the power transmission path in response to the power supply equipment providing power to the processing device, and turn off the power transmission path in response to the power supply equipment being cut off from the third component so that power output by the power storage and supply module is controlled to flow to the extension device.

7. The electronic apparatus according to claim 6, wherein the control module comprises a switch disposed on the power transmission path, wherein the switch is in an on state in response to the power supply equipment providing power to the processing device, and in an off state in response to the power supply equipment being cut off from the third component.

8. The electronic apparatus according to claim 5, wherein a first end of the first switch tube is connected to the third component, a second end of the first switch tube is connected to the first component, a third end of the first switch tube is connected to the control circuit; and the control circuit controls a state of the first switch tube by controlling a voltage of the third end of the first switch tube.

9. The electronic apparatus according to claim 8, wherein the control circuit comprises a first resistor, a first capacitor, a second resistor and a second capacitor, the first resistor and the first capacitor are connected in parallel to form a charging and discharging circuit, the first resistor, the second resistor and the second capacitor are connected in series, and the second resistor is disposed between the first resistor and the second capacitor.

10. The electronic apparatus according to claim 9, wherein one end of the first resistor is connected to the first end of the first switch tube, and the third end of the first switch tube is connected to the other end of the first resistor, a first end of the second switch tube is connected to a first end of the second capacitor, a second end of the second switch tube is grounded, and a third end of the second switch tube is connected to an external voltage signal.

11. The electronic apparatus according to claim 10, wherein the external voltage signal is configured to keep the second switch tube to be in an on state in response to the power supply equipment being cut off from the third component, and keep the first switch tube to be in an off state in response to the second switch tube being in an on state.

12. The electronic apparatus according to claim 10, wherein the external voltage signal is configured to keep the second switch tube to be in an off state in response to the power supply equipment providing power to the processing device, and keep the first switch tube to be in an on state in response to the second switch tube being in an off state.

13. The electronic apparatus according to claim 1, wherein the processing device is a laptop, and the extension device comprises one or more of a display screen, a docking station, a mouse, a keyboard, or an external hard drive.

14. A power supply method comprising:
in response to an electronic apparatus being in a first state, controlling the electronic apparatus to connect to a processing device and an extension device, to allow external power to provide power to the processing device through a first component of the electronic apparatus, and to allow the external power to provide power to the extension device; and in response to the electronic apparatus being in a second state, controlling the electronic apparatus to connect to the processing device and the extension device, to allow power to be supplied to the extension device through a second component of the electronic apparatus and allow the processing device to be powered by a power storage module of the processing device in response to the external power being cut off, wherein, after the electronic apparatus is switched from the first state to the second state, a connection between the extension device and the processing device is capable of being maintained, the first component is connected to the processing device containing the power storage module, the second component is connected to the extension device, and the extension device is configured to provide extended functions and/or performance to the processing device;

the first component is connected to a third component through a power transmission path, the third component is connected to an external power, a control module is disposed on the power transmission path, the control module includes a first switch tube disposed on the power transmission path, a second switch tube and a control circuit, and the control circuit is disposed between the first switch tube and the second switch tube; and the method further includes:
turning on, by the control module, the power transmission path in response to the external power providing power to the processing device, including:
controlling the second switch tube to be in an off state, and keeping the control circuit to control the first switch tube in an on state in response to the external power providing power to the processing device; and turning off, by the control module, the power transmission path in response to the external power being cut off from the third component so that power output by the power storage and supply module is controlled to flow to the extension device, including:
controlling the second switch tube to be in an on state and keeping the control circuit to control the first switch tube in an off state in response to the external power being cut off from the third component.

15. A non-transitory computer-readable storage medium storing instructions that, when executed by a processor, cause the processor to:
in response to an electronic apparatus being in a first state, control the electronic apparatus to connect to a processing device and an extension device, to allow external power to provide power to the processing device through a first component of the electronic apparatus, and to allow the external power to provide power to the extension device; and in response to the electronic apparatus being in a second state, control the electronic apparatus to connect to the processing device and the extension device, to allow power to be supplied to the extension device through a second component of the electronic apparatus and allow the processing device to be powered by a power storage module of the processing device in response to the external power being cut off, wherein:

after the electronic apparatus is switched from the first state to the second state, a connection between the extension device and the processing device is capable of being maintained, the first component is connected to the processing device containing the power storage module, the second component is connected to the extension device, and the extension device is configured to provide extended functions and/or performance to the processing device;

the first component is connected to a third component through a power transmission path, the third component is connected to an external power, a control module is disposed on the power transmission path, the control module includes a first switch tube disposed on the power transmission path, a second switch tube and a control circuit, and the control circuit is disposed between the first switch tube and the second switch tube; and the processor is further configured to:

control the control module to turn on the power transmission path in response to the external power providing power to the processing device, including:
controlling the second switch tube to be in an off state, and keeping the control circuit to control the first switch tube in an on state in response to the external power providing power to the processing device; and control the control module to turn off the power transmission path in response to the external power being cut off from the third component so that power output by the power storage and supply module is controlled to flow to the extension device, including:
controlling the second switch tube to be in an on state and keeping the control circuit to control the first switch tube in an off state in response to the external power being cut off from the third component.

* * * * *